United States Patent
Tachiiri et al.

(10) Patent No.: US 12,539,912 B2
(45) Date of Patent: Feb. 3, 2026

(54) VEHICLE TRAVEL CONTROL DEVICE

(71) Applicant: DENSO CORPORATION, Kariya (JP)

(72) Inventors: Motoki Tachiiri, Nisshin (JP); Yuta Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 20 days.

(21) Appl. No.: 18/777,299

(22) Filed: Jul. 18, 2024

(65) Prior Publication Data

US 2024/0367717 A1   Nov. 7, 2024

Related U.S. Application Data

(63) Continuation of application No. PCT/JP2023/001122, filed on Jan. 17, 2023.

(30) Foreign Application Priority Data

Jan. 21, 2022  (JP) ................... 2022-008273

(51) Int. Cl.
*B62D 6/00* (2006.01)
*B60W 30/095* (2012.01)
*B62D 7/06* (2006.01)
*B62D 7/15* (2006.01)

(52) U.S. Cl.
CPC ......... *B62D 6/003* (2013.01); *B60W 30/0956* (2013.01); *B62D 7/06* (2013.01); *B62D 7/1509* (2013.01)

(58) Field of Classification Search
CPC ........ B62D 6/003; B62D 6/002; B62D 6/005; B62D 7/06; B62D 7/14; B62D 7/146; B62D 7/15; B62D 7/1509; B60W 30/0956
See application file for complete search history.

(56) References Cited

U.S. PATENT DOCUMENTS

| | | | |
|---|---|---|---|
| 2004/0186647 A1* | 9/2004 | Ono ..................... | B60T 8/1755 701/80 |
| 2009/0292421 A1* | 11/2009 | Williams ................. | B62D 5/04 701/42 |
| 2015/0246684 A1* | 9/2015 | Ahern .................. | B62D 5/0457 182/69.5 |
| 2022/0041206 A1* | 2/2022 | Toyoda .................... | B60G 3/06 |
| 2025/0065949 A1* | 2/2025 | Park ..................... | B62D 7/1509 |

FOREIGN PATENT DOCUMENTS

| | | |
|---|---|---|
| JP | 01-098070 U1 | 4/1989 |
| JP | H01-098071 U1 | 4/1989 |
| JP | 2007-106387 A | 10/2005 |
| JP | 2007-261534 A | 10/2007 |
| JP | 2016-179739 A | 10/2016 |

\* cited by examiner

*Primary Examiner* — Jacob M Amick
(74) *Attorney, Agent, or Firm* — Maschoff Brennan

(57) ABSTRACT

A vehicle travel control device includes: a movement direction indication unit configured to provide an instruction indicating a direction of lateral movement or oblique movement; a target tire angle calculation controller configured to calculate a target tire angle; and a coordination tire angle calculation unit configured to calculate a coordination tire angle for coordination of a movement direction of each tire. The target tire angle calculation controller is configured to correct the target tire angle.

6 Claims, 15 Drawing Sheets

FIRST TO THIRD EMBODIMENTS

FIRST EMBODIMENT

LATERAL MOVEMENT

PARALLEL PARKING WITH LATERAL MOVEMENT

[A] COORDINATION TIRE ANGLE = MAXIMUM TIRE ANGLE

[B] COORDINATION TIRE ANGLE = MINIMUM TIRE ANGLE

PARALLEL PARKING WITH OBLIQUE MOVEMENT

[A] COORDINATION TIRE ANGLE = MAXIMUM TIRE ANGLE

[B] COORDINATION TIRE ANGLE = MINIMUM TIRE ANGLE

SECOND EMBODIMENT

THIRD EMBODIMENT

FOURTH EMBODIMENT

FIFTH EMBODIMENT

VEHICLE TRAVEL CONTROL DEVICE

CROSS REFERENCE TO RELATED APPLICATIONS

The present application is a continuation application of International Patent Application No. PCT/JP2023/001122 filed on Jan. 17, 2023, which designated the U.S. and claims the benefit of priority from Japanese Patent Application No. 2022-008273 filed on Jan. 21, 2022. The entire disclosures of all of the above applications are incorporated herein by reference.

TECHNICAL FIELD

The present disclosure relates to a vehicle travel control device.

BACKGROUND

Conventionally, there is a technology for guiding a subject vehicle to a target position by moving the subject vehicle in an oblique or lateral direction. For example, in a comparative example, a vehicle uses a driving assistance device to guide the vehicle to the side of an available parking space, then steers each wheel perpendicular to the center line of the vehicle and moves in the lateral direction to park in the space.

SUMMARY

A vehicle travel control device includes: a movement direction indication unit configured to provide an instruction indicating a direction of lateral movement or oblique movement; a target tire angle calculation controller configured to calculate a target tire angle; and a coordination tire angle calculation unit configured to calculate a coordination tire angle for coordination of a movement direction of each tire. The target tire angle calculation controller is configured to correct the target tire angle.

BRIEF DESCRIPTION OF THE DRAWINGS

The above and other features and advantages of the present disclosure will become more apparent from the following detailed description taken in conjunction with the accompanying drawings.

DETAILED DESCRIPTION

Figure 1:
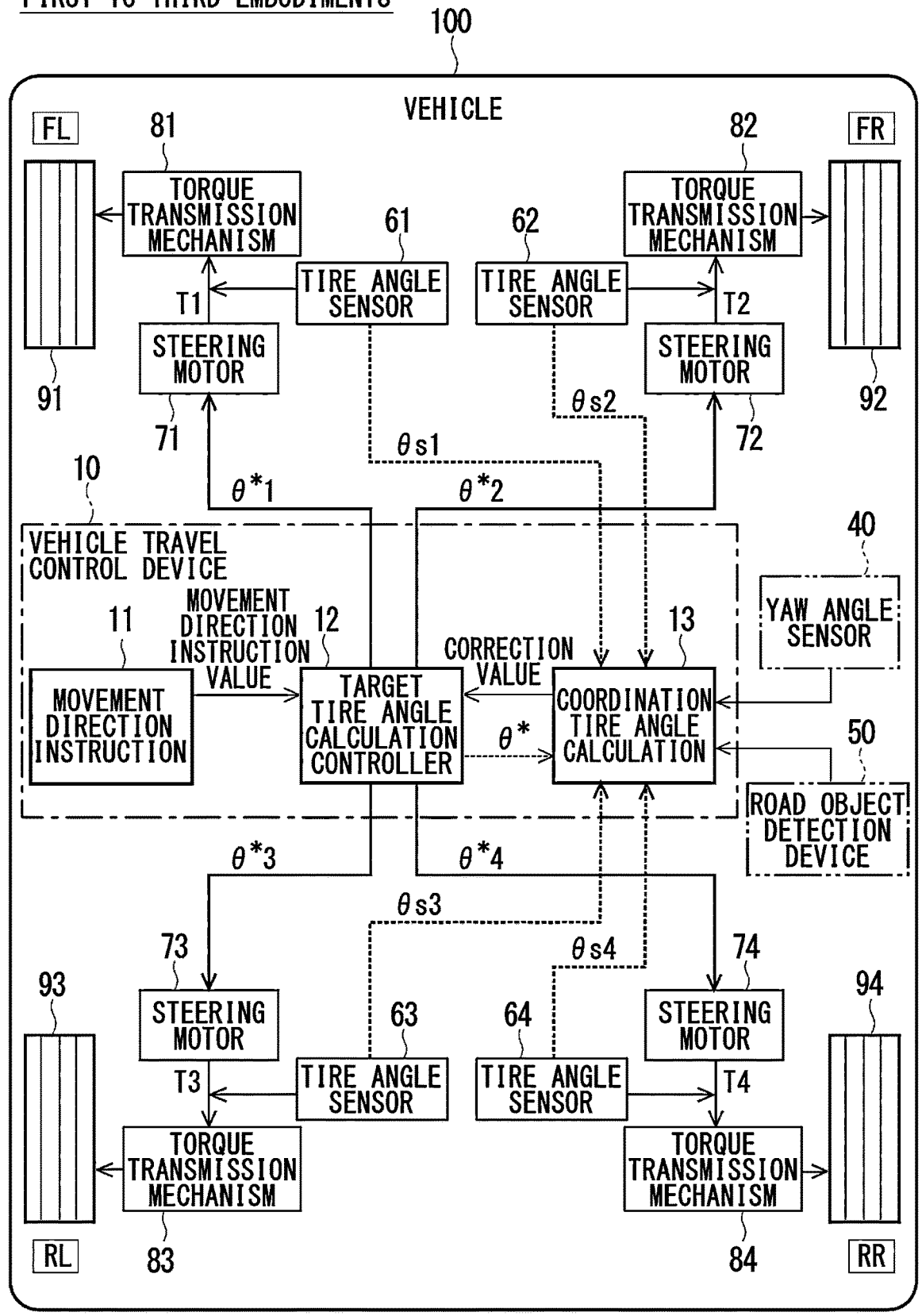
FIG. 1 is a block diagram of an independently steering vehicle equipped with a vehicle travel control device according to first to third embodiments.

In the comparative example, when a tire angle of any one of four wheels of the vehicle is misaligned with respect to the tire angles of the other wheels, a yaw rotation occurs during lateral movement, and the vehicle is parked at an oblique angle in the parking space. This situation occurs not only in the case of lateral movement, but also in the case of oblique movement.

One example of the present disclosure provides a vehicle travel control device that prevents yaw rotation during lateral or oblique movement.

The vehicle travel control device according to the present disclosure is capable of steering all tires of three or more wheels, and the steering torque output by the steering motor in accordance with a target tire angle is transmitted to each tire via a torque transmission device, and thereby the travel of the vehicle is controlled as each tire is steered.

This vehicle travel control device includes a movement direction instruction unit, a target tire angle calculation controller, and a coordination tire angle calculation unit.

The movement direction indication unit indicates the direction of lateral or oblique movement. The target tire angle calculation controller calculates and provides an instruction indicating a target tire angle for each tire based on the movement direction instruction value from the movement direction instruction unit. The coordination tire angle calculation unit calculates a coordination tire angle that coordinates the movement directions of the tires, based on the current tire angles of the tires detected by the tire angle sensors.

The target tire angle calculation controller corrects the target tire angle calculated based on the movement direction instruction value so that the angle approaches the coordination tire angle, and provides instruction of the corrected target tire angle to the steering motor.

In the present disclosure, it is possible to reduce the yaw rotation by performing coordination control to align all tire angles based on the current tire angles of each tire detected by a tire angle sensor during lateral or oblique movement.

A vehicle travel control device according to a plurality of embodiments will be described with reference to the drawings. The following first to fifth embodiments are collectively referred to as "present embodiment". The vehicle travel control device of this embodiment controls the travel of a vehicle having three or more wheels, all of which are steerable. In the first to fourth embodiments, the vehicle travel control device is mounted on a four-wheel independently steering vehicle in which all of the tires can be steered independently. In the fifth embodiment, the vehicle travel control device is mounted on a vehicle having one or more pairs of left and right wheels mechanically coupled to each other.

First Embodiment

A vehicle travel control device 10 according to the first embodiment will be described with reference to FIGS. 1 to 10. In an independently steering vehicle 100 shown in FIG. 1, all four tires 91 to 94 can be steered independently, and the vehicle travel control device 10 of the first to third embodiments is commonly mounted on the vehicle. The front left wheel 91 is defined as "FL", the front right wheel 92 is defined as "FR", the rear left wheel 93 is defined as "RL", and the rear right wheel 94 is defined as "RR". The term of "tire" may be also referred to as only a tire, only a wheel, or a combination of the tire and the wheel. Similarly, the term of "wheel" may be also referred to as only the tire, only the wheel, or the combination of the tire and the wheel.

The vehicle 100 include steering motors 71 to 74, torque transmission devices 81 to 84, and tire angle sensors 61 to 64 corresponding to the respective tires 91 to 94. The second digit of the code of each element corresponds to "1" to "4". The similar applies to the symbols of steering torques T1 to T4, the target tire angles $\theta*1$ to $\theta*4$, and the current tire angles $\theta s1$ to $\theta s4$.

Representatively, the following description will use the symbols for the steering motor 71, torque transmission device 81, and tire angle sensor 61 corresponding to the left front wheel 91, as well as the symbols for the steering torque T1, target tire angle $\theta*1$, and current tire angle $\theta s1$. The similar applies to the other tires 92, 93, and 94.

The steering motor 71 outputs the steering torque T1 in accordance with the target tire angle $\theta*1$ instructed by a target tire angle calculation controller 12 of the vehicle travel control device 10. The torque transmission device 81 transmits the steering torque T1 outputted by the steering motor 71 to the tire 91. The tire 91 is steered by the transmitted steering torque T1.

Figure 15:
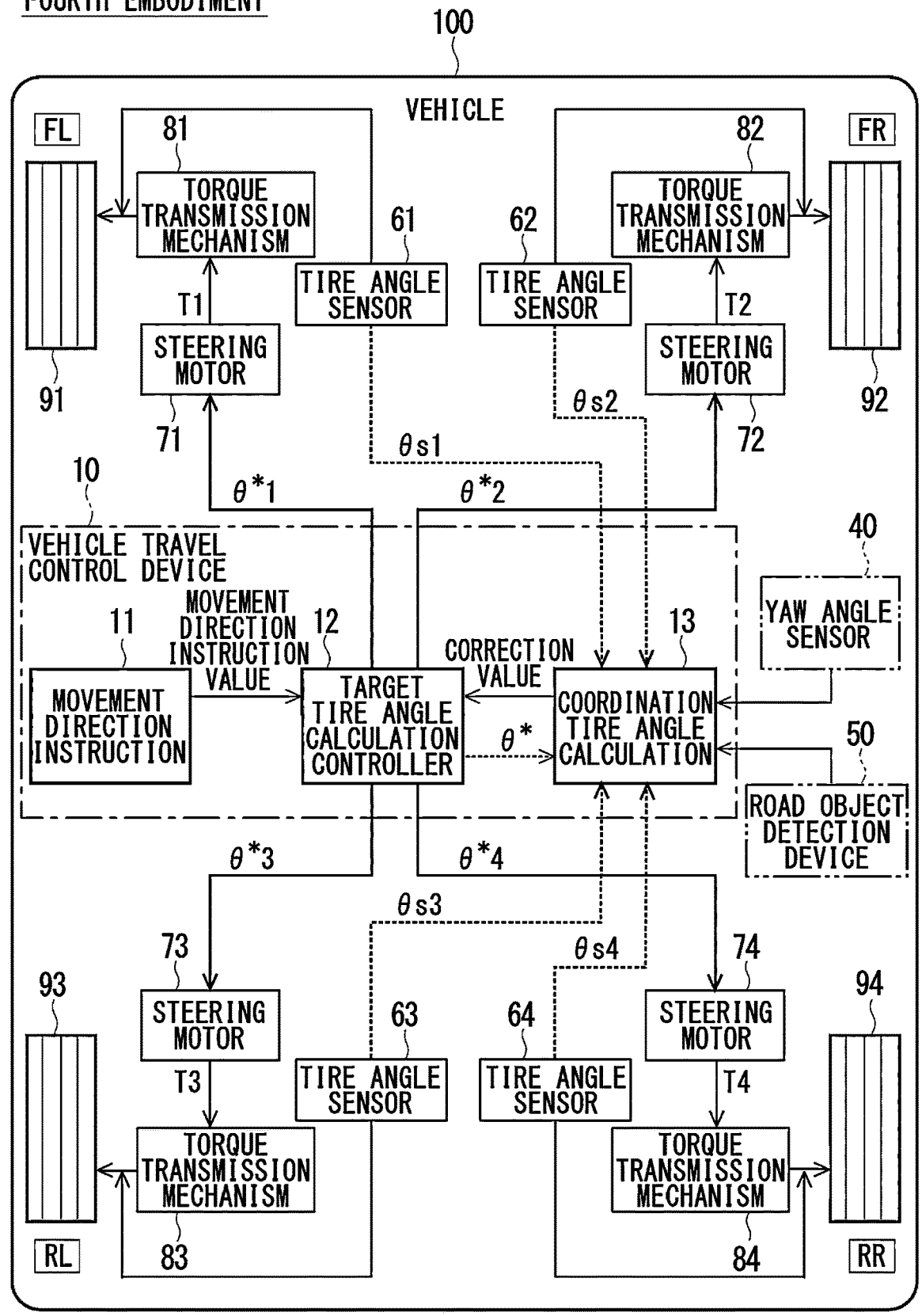
FIG. 15 is a block diagram of an independently steering vehicle equipped with the vehicle travel control device according to a fourth embodiment, the vehicle having a different arrangement of tire angle sensors.

The tire angle sensor 61 detects a current tire angle $\theta s1$ of the steering tire 91 and notifies a coordination tire angle calculation unit 13 of the current tire angle $\theta s1$. The tire angle sensor 61 shown in FIG. 1 is configured as a motor angle sensor provided within the steering motor 71, and estimates the tire angle by multiplying the motor angle by a conversion coefficient. Another configuration of the tire angle sensor 61 is shown in FIG. 15 as the fourth embodiment.

Here, the characteristics of the independently steering vehicle 100 will be described. Conventionally, in a general vehicle, a pair of left and right tires are mechanically connected via a link, and the tires are turned by steering operation of a steering wheel. In the future, it is thought that steer-by-wire systems, in which the steering and left and right tire links are mechanically separated, and four-wheel independent turn wheel vehicles, in which not only the left and right front wheels but also the left and right rear wheels can be turned independently, will develop.

Figure 2A:
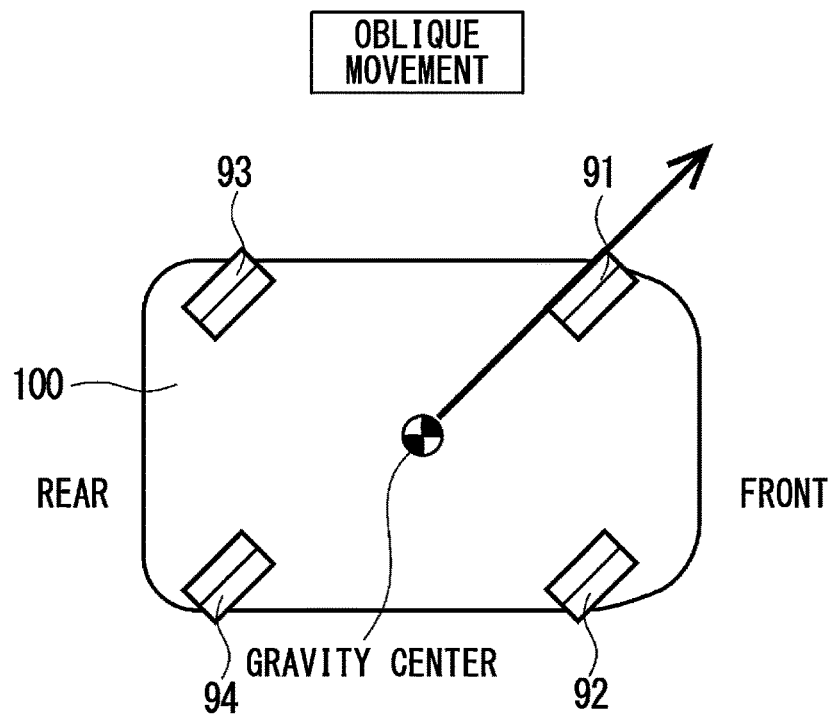
FIG. 2A is a diagram showing oblique movement in the independently steering vehicle.
Figure 2B:
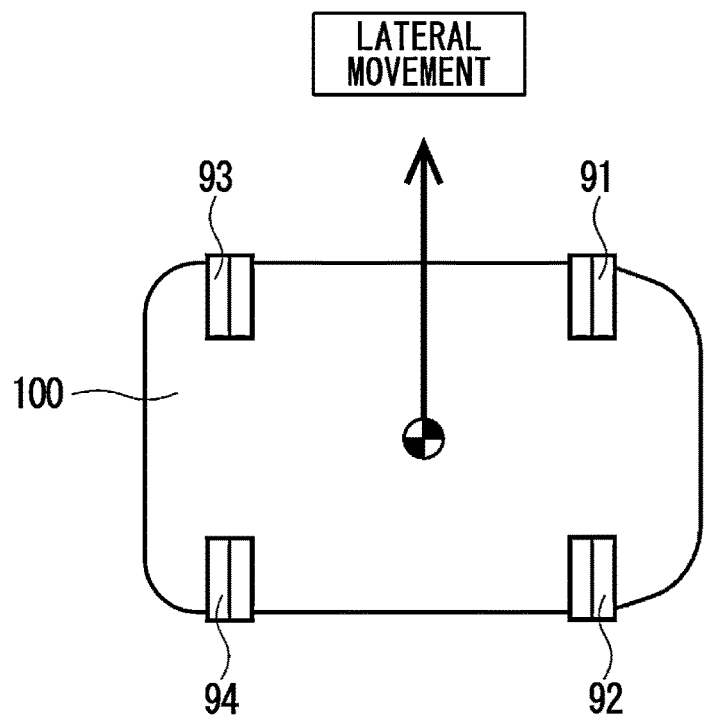
FIG. 2B is a diagram showing lateral movement in the independently steering vehicle.

In a four-wheel independently steering vehicle, the diagonal movement shown in FIG. 2A and the lateral movement shown in FIG. 2B are possible. In oblique movement, all the tires 91 to 94 are steered to the same tire angle (for example, 45 degrees). In the lateral movement, all tires 91 to 94 are steered to 90 degrees. For example, the oblique movement is effective at the time of changing travel lanes, and the lateral movement is effective when parallel parking. In FIG. 2A and subsequent figures, the front side of the independently steering vehicle 100 is illustrated in a streamlined shape. The vehicle's "front/rear" and "gravity center" letters are only shown in FIG. 2A and are omitted in subsequent figures.

Figure 3:
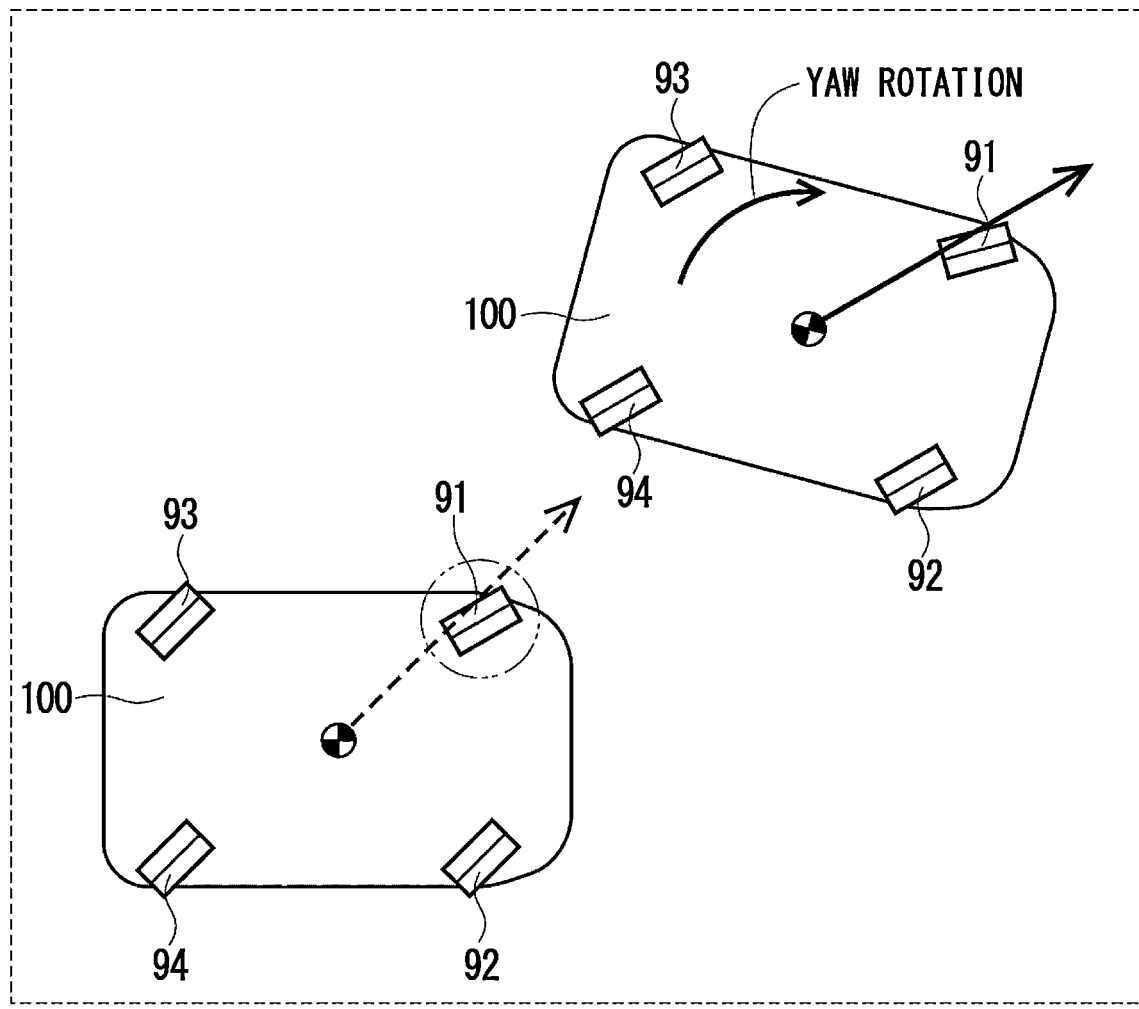
FIG. 3 is a diagram for illustrating turning during oblique movement due to steering delay.

Difficulties with lateral and oblique movement will be described with reference to FIG. 3. To achieve the lateral or oblique movement, all the tires 91 to 94 need only the steering at the same angle and move in the same direction. However, due to differences in the wheel loads applied to the tires 91 to 94 and the friction coefficients of the contacting road surfaces, differences arise in the loads for turning the tires 91 to 94. There may be cases where the tire angle of one tire is different from the tire angle of the other tires. When the steering of some of the four tires lags behind or leads the steering of the other tires, the steering balance is lost and the vehicle will yaw. In an example shown in FIG. 3, the steering of the left front wheel 91 lags behind the other tires 92, 93, and 94, and a counterclockwise yaw rotation occurs.

This phenomenon also occurs during a transitional period when the tire angle changes. For example, in a scene where the tire angle is steered by 20 degrees, even when all tire angles become 20 degrees in the final steady state region, it is assumed that during the transition period, all wheels except one are at 10 degrees and that one wheel is at 9 degrees. In this case, the vehicle starts to move laterally or obliquely while yaw rotation is occurring.

Therefore, the vehicle travel control device 10 of the present embodiment is used for reducing the yaw rotation during the lateral movement and the oblique movement. The vehicle travel control device 10 includes a movement direction instruction unit 11, the target tire angle calculation controller 12, and the coordination tire angle calculation unit 13. The movement direction instruction unit 11 provides an instruction indicating the direction of lateral or oblique movement as a movement direction instruction value. The target tire angle calculation controller 12 calculates target tire angles $\theta'1$ to $\theta'4$ for the tire 91 to 94 based on the movement direction instruction value from the movement direction instruction unit 11, and provides instructions indicating the angles.

The coordination tire angle calculation unit 13 calculates a coordination tire angle that coordinates the movement directions of the tires 91 to 94, based on the current tire angles $\theta s1$ to $\theta s4$ of the tires 91 to 94 detected by the tire angle sensors 61 to 64. In addition, the coordination tire angle calculation unit 13 calculates correction values $\theta c1$ to $\theta c4$ for the target tire angles $\theta*1$ to $\theta*4$ from the difference between the coordination tire angle and the target tire angles $\theta*1$ to $\theta*4$. The inputs from a yaw angle sensor 40 and a road object detection device 50 will be described later in the second and third embodiments.

The target tire angle calculation controller 12 acquires a correction value from the coordinated tire angle calculation unit 13, and corrects the target tire angles $\theta*1$ to $\theta*4$ calculated based on the movement direction instruction value so that the angles approach the coordination tire angles. The target tire angle calculation controller 12 then provides instructions of the corrected target tire angle to the steering motors 71 to 74. A series of controls based on feedback of the current tire angles $\theta s1$ to $\theta s4$ in this manner is called "coordination control". By cooperating the movement directions of all the tires 91 to 94 through the coordination control, yaw rotation during lateral or oblique movement is reduced.

Figure 4:
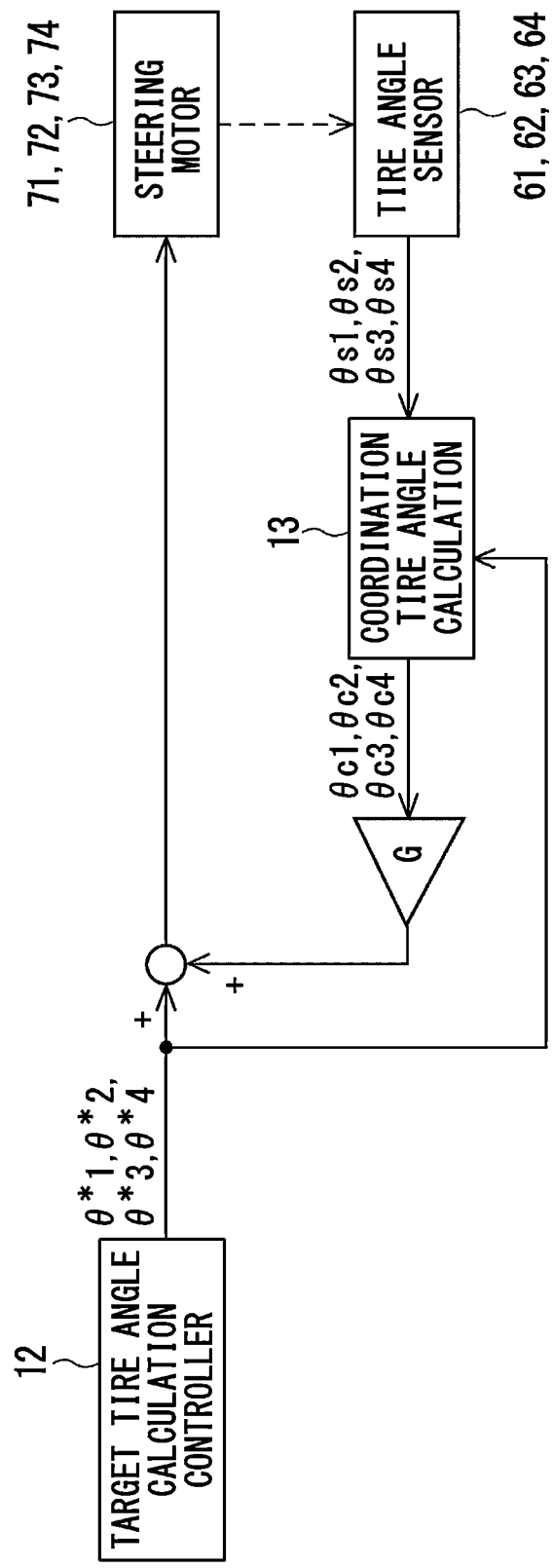
FIG. 4 is a block diagram of a coordination control according to the first embodiment.

FIG. 4 shows a block diagram of the coordination control according to the first embodiment. The current tire angles θs1 to θs4 of the tires 91 to 94 steered by the steering motors 71 to 74 are input to the coordination tire angle calculation unit 13. The coordination tire angle calculation unit 13 calculates the coordination tire angle based on the current tire angles θs1 to θs4, and further calculates correction values θc1 to θc4 from the difference between the coordination tire angles and the target tire angles θ*1 to θ*4. The correction values θc1 to θc4 are multiplied by a gain, and the results are respectively added to the target tire angles θ*1 to θ*4. Here, the gain is basically set to 1. Depending on the sign of the correction value, the correction value may be subtracted from the target tire angles θ*1 to θ*4.

Figure 5:
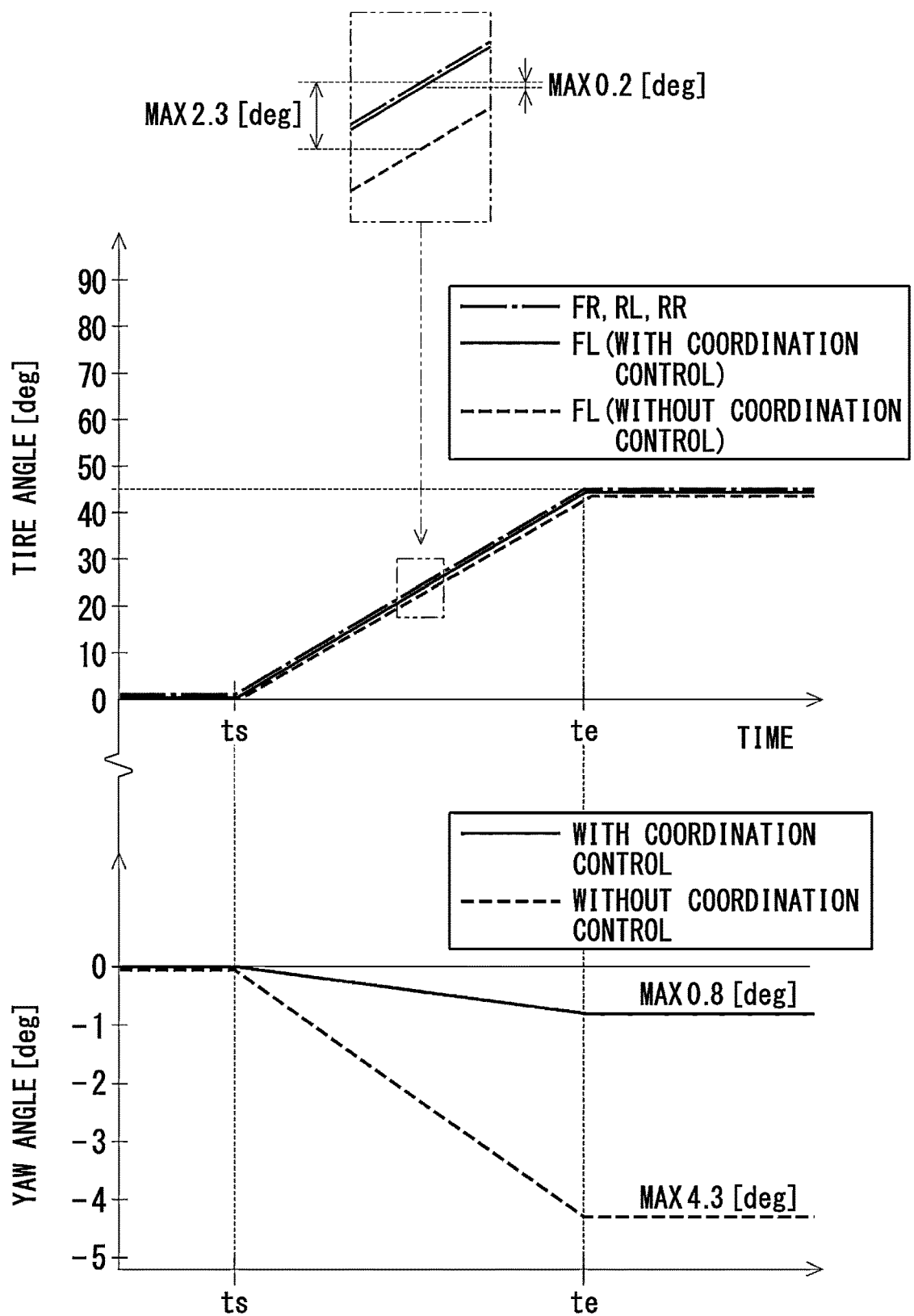
FIG. 5 is a diagram showing changes in tire angle and yaw angle during oblique movement (45 degrees).

FIG. 5 shows the changes in tire angle and yaw angle in the cases without and with the coordination control during the oblique movement of 45 degrees. When the vehicle is traveling at a constant speed of 10 km/h, the tire angle changes from 0 degrees to 45 degrees during the period from a time ts to a time te. In the case of no coordination control, a maximum of the delay in the tire angle of the left front wheel 91 (FL) with respect to the tire angles of the other tires 92, 93, 94 (FR, RL, RR) is 2.3 degrees. A maximum of the vehicle yaw angle is 4.3 degrees.

In contrast, in the case where the coordination control is performed, the delay in the tire angle of the left front wheel 91 (FL) is reduced to a maximum of 0.2 degrees. A maximum of the vehicle yaw angle is reduced to 0.8 degrees.

Figure 6:
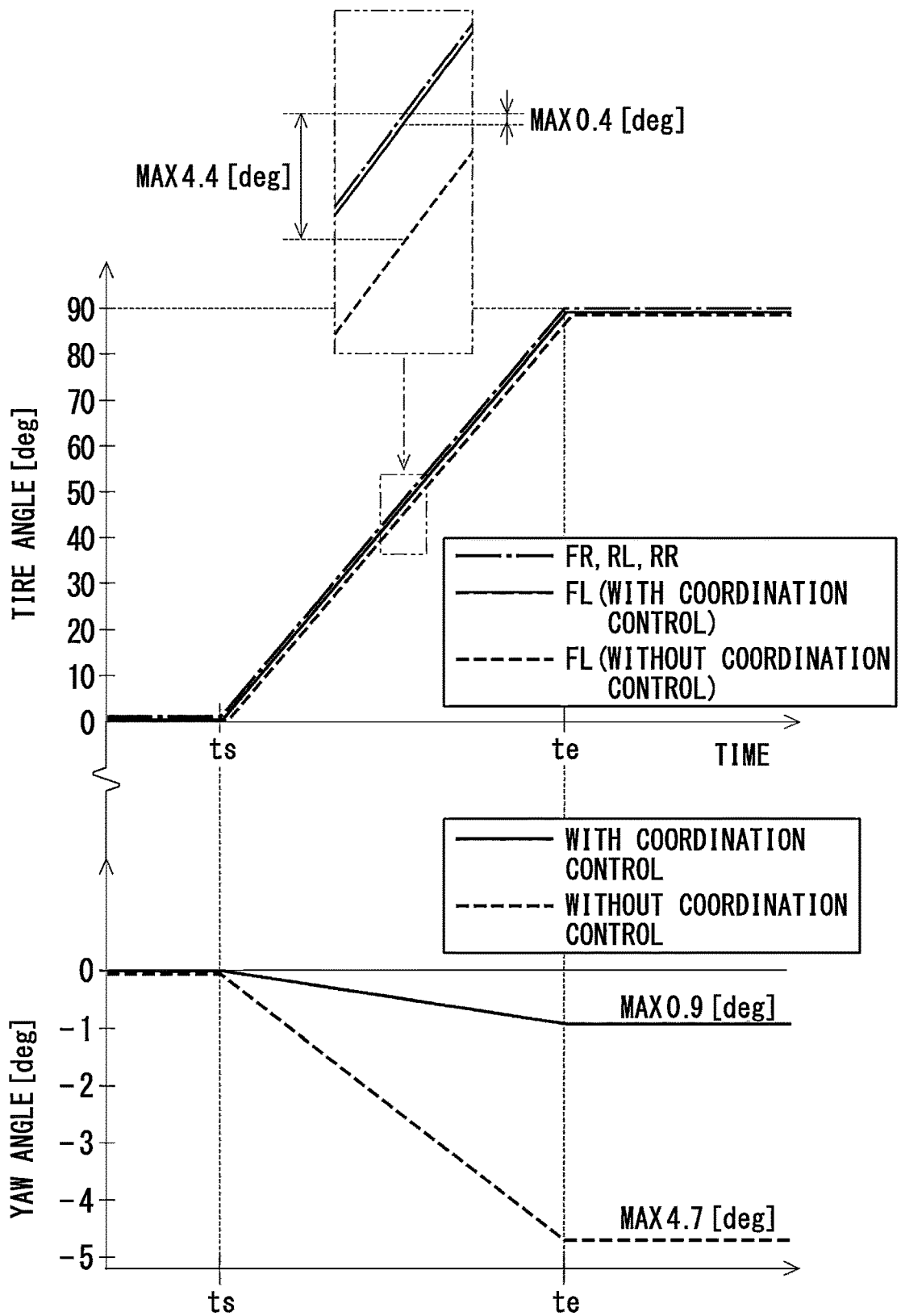
FIG. 6 is a diagram showing changes in tire angle and yaw angle during lateral movement.

FIG. 6 shows the changes in tire angle and yaw angle in the cases without and with the coordination control during the lateral movement. The tire angle changes from 0 degrees to 90 degrees during the period from a time ts to a time te. In the case of no coordination control, a maximum of the delay in the tire angle of the left front wheel 91 (FL) with respect to the tire angles of the other tires 92, 93, 94 (FR, RL, RR) is 4.4 degrees. The maximum of the vehicle yaw angle is 4.7 degrees. Then, when the lateral movement ends, the vehicle is parked in a state where, for example, the left front wheel 91 is depart from the white line (width 0.15 meters) on the edge of the road.

In contrast, in the case where the coordination control is performed, the delay in the tire angle of the left front wheel 91 (FL) is reduced to a maximum of 0.4 degrees. A maximum of the vehicle yaw angle is reduced to 0.9 degrees. As a result, the deviation of the left front wheel 91 at the end of the lateral movement is within the width of the white line (0.15 meters). It becomes possible to park without going beyond the white line.

Figure 7:
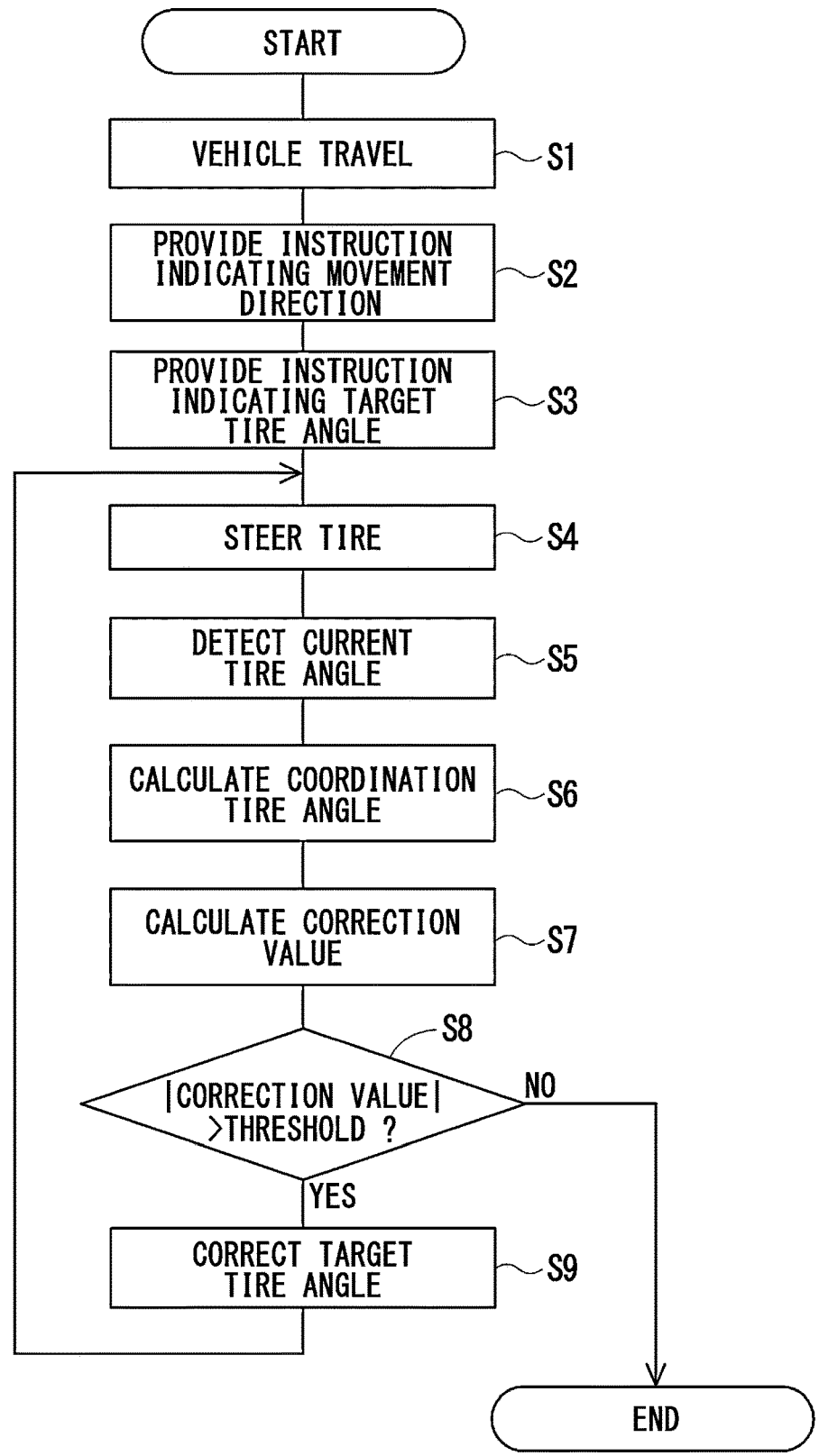
FIG. 7 is a flowchart of coordination control according to the first embodiment.

The flowchart of FIG. 7 shows a coordination control routine according to the first embodiment. In the following flowchart, a symbol S may indicate a process.

In S1, the vehicle 100 is traveling. In S2, the movement direction instruction unit 11 provides an instruction indicating the movement direction. In S3, the target tire angle calculation controller 12 provides an instruction indicating the target tire angles to each of the tires 91 to 94. In S4, the steering motors 71 to 74 steer the tires 91 to 94.

In S5, the tire angle sensors 61 to 64 detect the current tire angles θs1 to θs4 of the respective tires 91 to 94 and notify the coordination tire angle calculation unit 13 of the detected tire angles. In S6, the coordination tire angle calculation unit 13 calculates the coordination tire angle based on the current tire angles θs1 to θs4. Further, in S7, the coordination tire angle calculation unit 13 calculates correction values θc1 to θc4 for the target tire angles θ*1 to θ*4 from the difference between the coordination tire angle and the target tire angles θ*1 to θ*4.

In S8, it is determined whether the absolute value of the correction values θc1 to θc4 is greater than a threshold value for each of the tires 91 to 94. The threshold value is set to a value that is regarded as substantially 0 when the detection errors of the tire angle sensors 61 to 64 and the like are taken into consideration. In a case of YES in S8, the target tire angle calculation controller 12 adds the correction values θc1 to θc4 to the target tire angles θ*1 to θ*4 in S9 to correct the target tire angles θ*1 to θ*4. Then, the process returns to before S4 and the routine is repeated.

When the correction values θc1 to θc4 based on the difference between the coordination tire angle and each of the target tire angles θ*1 to θ*4 become equal to or smaller than the threshold value, the determination in S8 is NO, and the coordination control routine ends.

Figure 8:
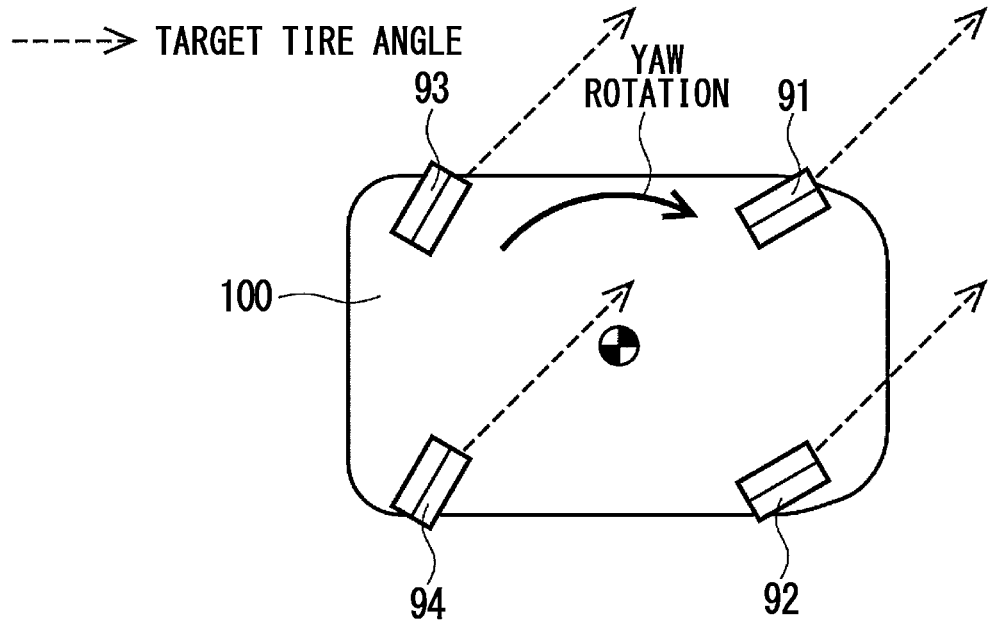
FIG. 8 is a diagram for illustrating a difference between feedback control and the coordination control with respect to a target tire angle.
Figure 8:
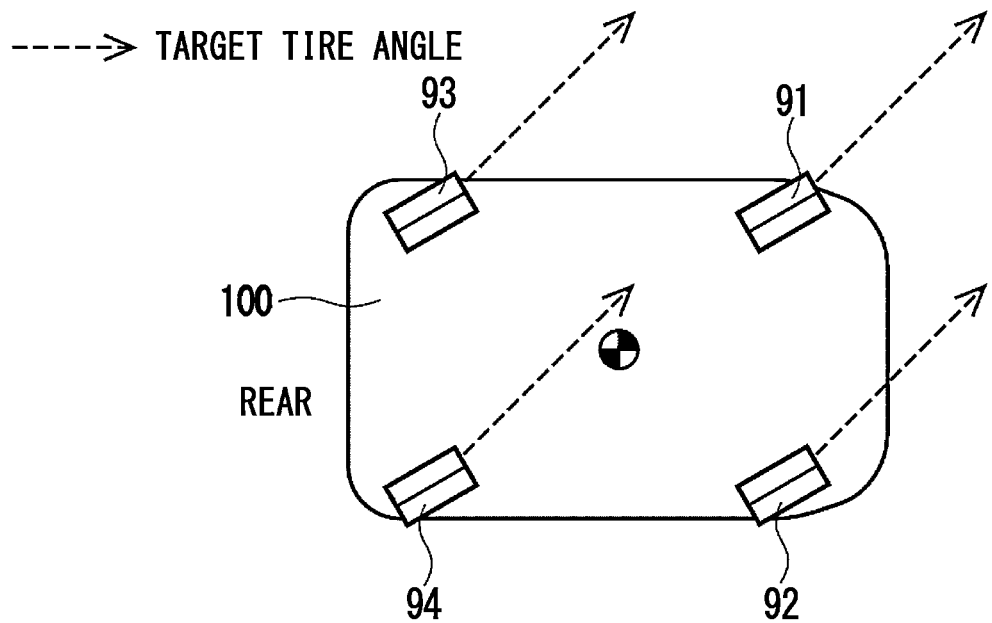
Figure 9:
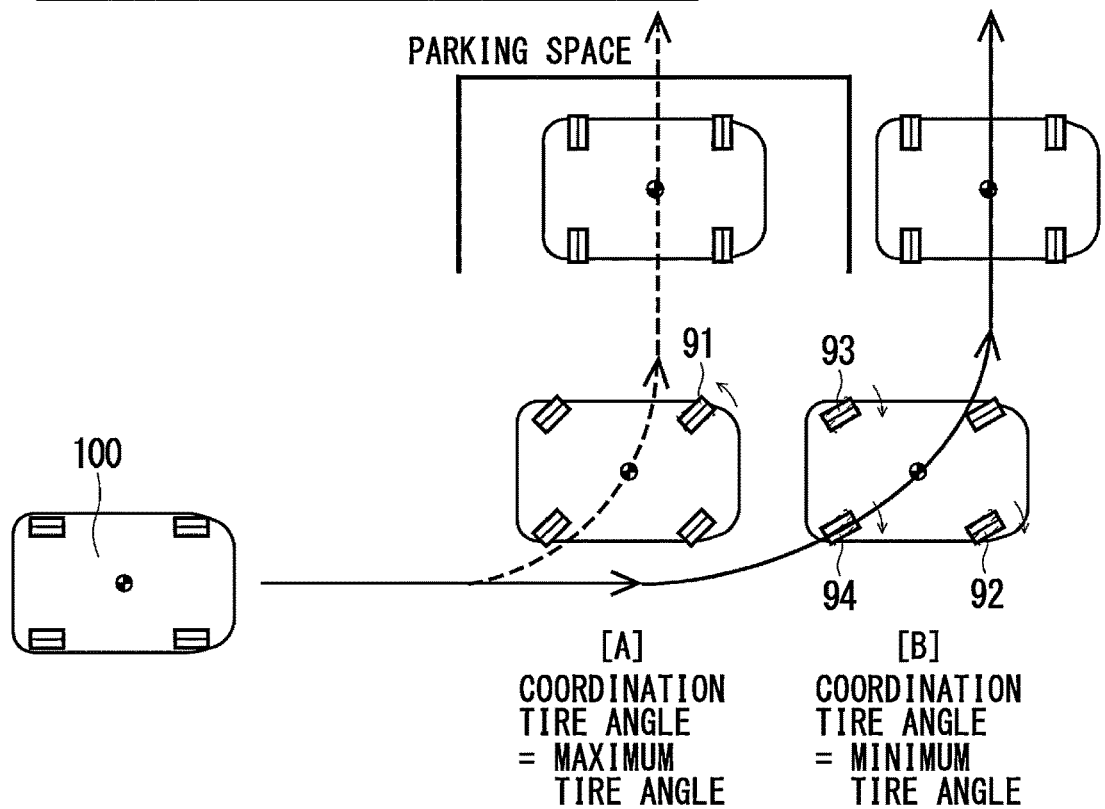
FIG. 9 is a diagram for illustrating selection of a coordination tire angle during parallel parking with the lateral movement.

Next, supplementary matters regarding the coordination control will be described with reference to FIG. 8 to FIG. 10. The upper part of FIG. 8 shows the effect of feedback control on the target tire angle. In the feedback control, each of the tires 91 to 94 is steered so that the current tire angles θs1 to θs4 of the tires 91 to 94 coincide with the target tire angles θ*1 to θ*4, respectively. When the current tire angles θs1 to θs4 are different, there is a possibility that yaw rotation will occur.

On the other hand, as shown in the lower part of FIG. 8, in the coordination control according to this embodiment, for example, when all the tires 91 to 94 are equally delayed from the target tire angles θ*1 to θ*4, no yaw rotation occurs. In other words, in order to reduce the yaw rotation, it is more important that the current tire angles θs1 to θs4 of the tire 91 to 94 are aligned with each other than that the current tire angles θs1 to θs4 of the tires 91 to 94 match the target tire angles θ*1 to θ*4.

Next, a method for selecting an optimal coordination tire angle from the current tire angles θs1 to θs4 of the tires 91 to 94 according to a purpose will be described. In a case of parallel parking with lateral movement as shown in FIG. 9, the allowable movement distance in the vehicle travel direction is limited. When the smallest tire angle is selected as the coordination tire angle as in [B], that is, when the tire angles of tires 92, 93, and 94 other than the left front wheel 91 are coordinated with the tire angle of the left front wheel 91, steering is likely to be delayed and the vehicle 100 is not likely to enter the parking space. Therefore, in this case, it is desirable to select the maximum tire angle that does not exceed the target tire angle as the coordination tire angle, as in [A], that is, to coordinate the tire angle of the left front wheel 91 with the tire angles of the other tires 92, 93, and 94.

Figure 10:
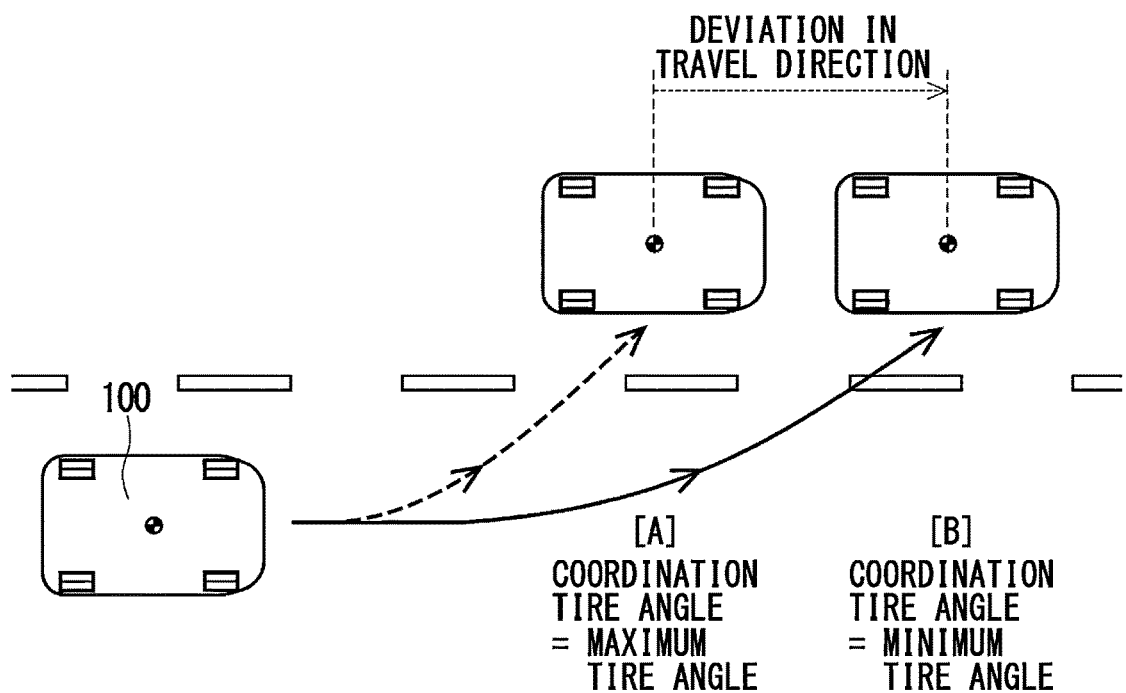
FIG. 10 is a diagram for illustrating selection of the coordination tire angle when changing lanes during the oblique movement.

In a case of lane change with the oblique movement as shown in FIG. 10, the allowable movement distance in the vehicle travel direction is not as strict as in parallel parking. Therefore, instead of using the maximum tire angle of [A], the minimum tire angle of [B] may be selected as the coordination tire angle. Thereby, the tire angles of the tires 91 to 94 may be reduced. Generally, one of the reasons why steering of tires is delayed is that the load due to external disturbance is high and torque is insufficient. Therefore, it is easier to control the other tires to coordinate with the tire delayed in steering than to steer the tire delayed in steering faster. Further, since there is no need to increase the torque of the steering motor for tires with high loads, power consumption is reduced.

In addition to the above, the coordination tire angle calculation unit 13 may determine the average value of all the current tire angles θs1 to θs4 as the coordination tire angle. Thereby, less correction steering is required than coordination of the delayed tire with the tire having the maximum tire angle. Therefore, it is possible to reduce the energy required for corrective steering.

Second and Third Embodiments

Next, optional configurations added to the first embodiment will be described with reference to FIG. 1 and FIG. 11 to FIG. 13. As indicated by a dashed line in FIG. 1, in the second embodiment, the vehicle 100 includes the yaw angle sensor 40 that detects the yaw angle of the vehicle 100. The yaw angle sensor also includes a yaw rate sensor and the like.

Figure 11:
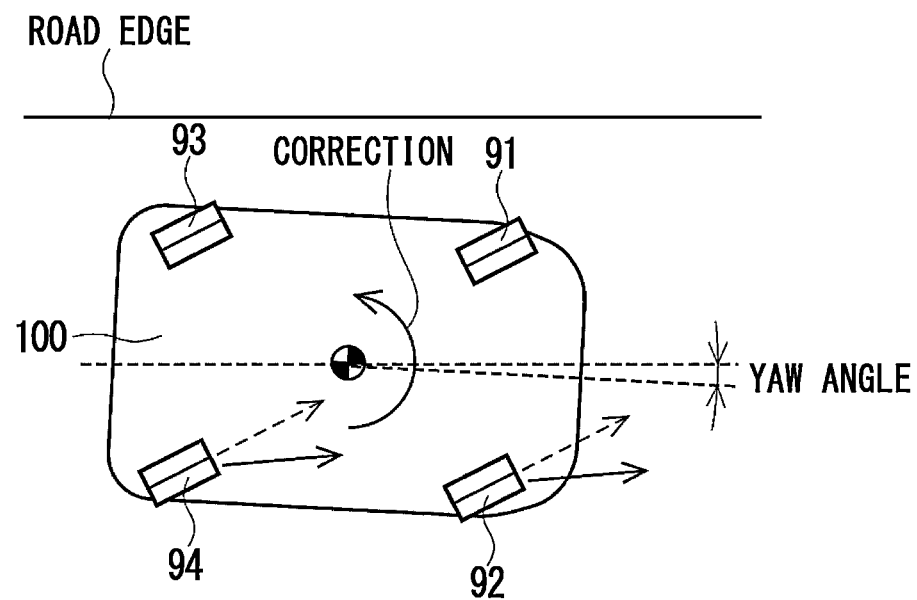
FIG. 11 is a diagram showing the yaw angle of a vehicle assumed in the second embodiment.

The coordination control makes it possible to reduce the yaw rotation during lateral or oblique movement. However, since one of the tires is steered to match the coordination tire angle, a small amount of yaw rotation occurs. In the example shown in FIG. 6, even with the coordination control, a maximum yaw angle of 0.9 degrees occurs. Therefore, as shown in FIG. 11, the vehicle may be parked and tilted relative to the edge of the road.

Figure 12:
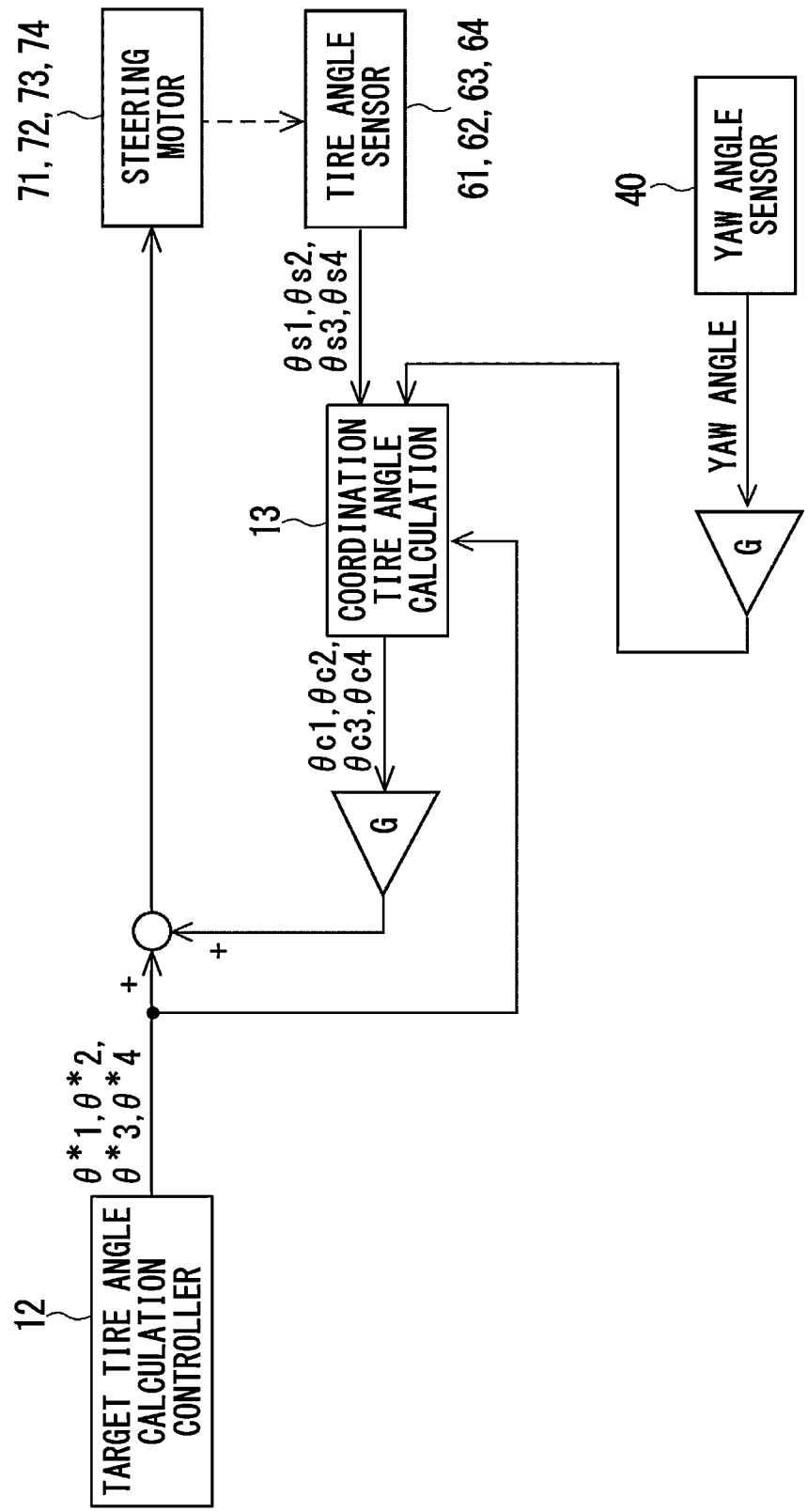
FIG. 12 is a block diagram of the coordination control according to the second embodiment.

Therefore, as shown in FIG. 12, in addition to the current tire angles θs1 to θs4 of the tires 91 to 94, a value obtained by multiplying the yaw angle obtained from the yaw angle sensor 40 by a predetermined gain is input to the coordination tire angle calculation unit 13. The coordination tire angle calculation unit 13 calculates the coordination tire angle based on the yaw angle so as to cancel the generated yaw angle. Thereby, it is possible to stop the vehicle 100 parallel to the edge of the road by making the vehicle's yaw angle close to zero as much as possible.

As indicated by the dashed line in FIG. 1, in the third embodiment, the vehicle 100 includes the road object detection device 50 that detects objects on the road, including road lines and guardrails. The term "road object" is not limited to three-dimensional objects, but also includes two-dimensional signs such as white lines that have no substantial thickness. Furthermore, the road object is not limited to objects that are always present in the peripheral environment, but also includes other vehicles parked nearby. Specifically, the road object detection device 50 includes an image detection device such as a camera, a sonar, and the like.

Figure 13:
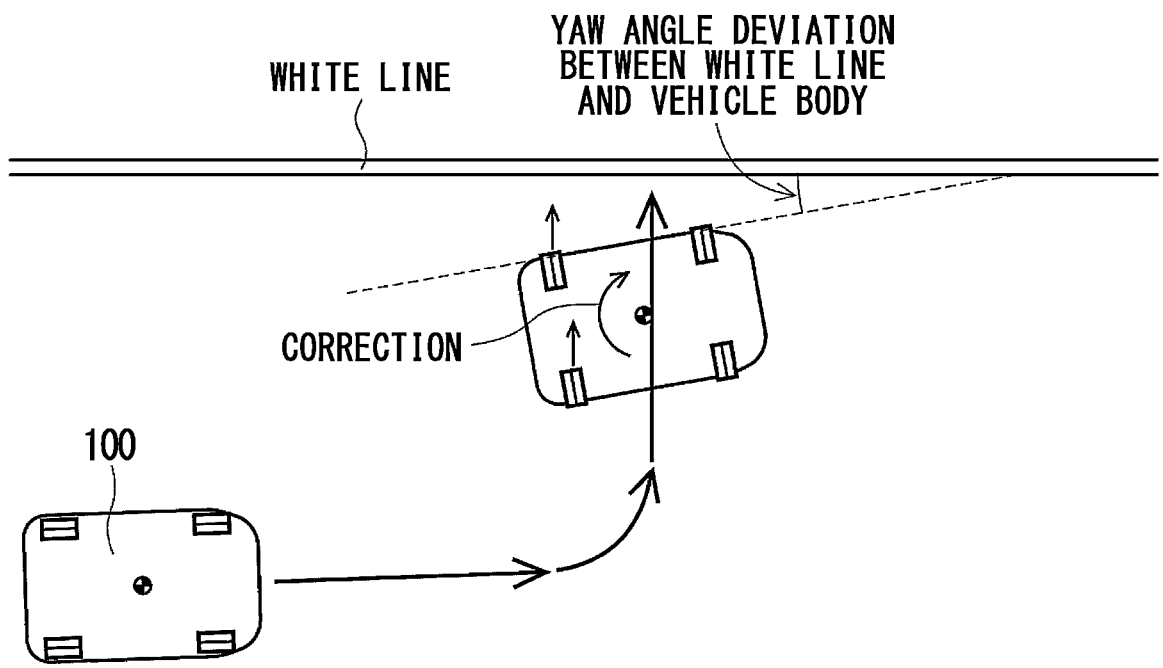
FIG. 13 is a diagram showing a yaw angle deviation between a white line and a vehicle body assumed in the third embodiment.

For example, when the parallel parking on the side of the road is performed, as shown in FIG. 13, it is expected that a yaw angle deviation will occur between the vehicle body and the road object, such as white lines or guardrails, after lateral movement.

Figure 14:
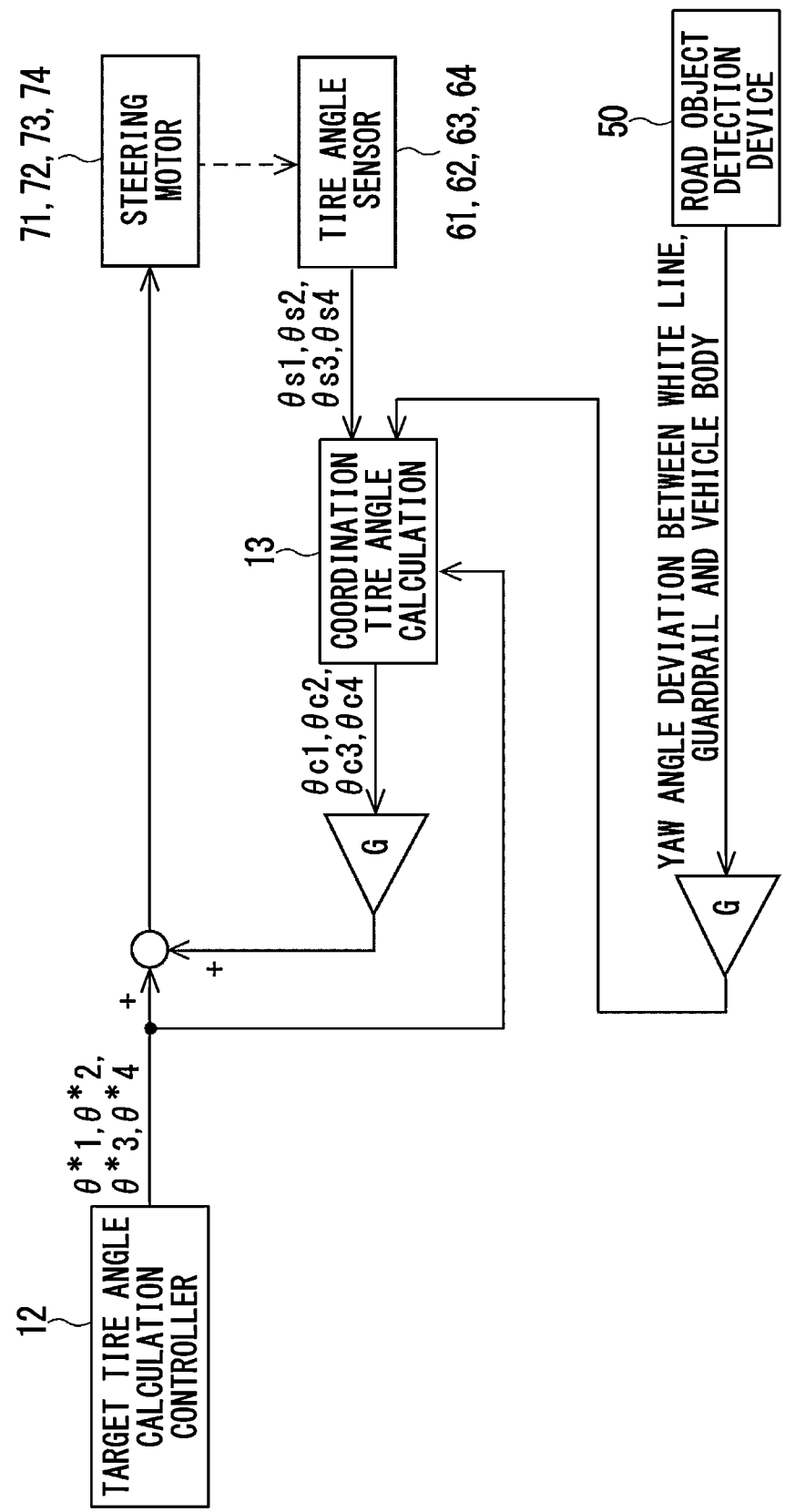
FIG. 14 is a block diagram of the coordination control according to the third embodiment.

Therefore, as shown in FIG. 14, in addition to the current tire angles θs1 to θs4 of the tires 91 to 94, a value obtained by multiplying the yaw angle deviation between the white line or guardrail and the vehicle body by a predetermined gain is input to the coordination tire angle calculation unit 13. The coordination tire angle calculation unit 13 calculates the coordination tire angle based on the "yaw angle deviation between the road object and the vehicle body", the angle being acquired from the road object detection device 50 so as to cancel the yaw angle deviation. Thereby, it is possible to correct the yaw angle deviation and stop the vehicle 100 parallel to the road edge.

Fourth Embodiment

In the fourth embodiment shown in FIG. 15, the tire angle sensors 61 to 64 are provided at different positions from the configuration shown in FIG. 1. The tire angle sensors 61 to 64 are respectively placed between the torque transmission devices (torque transmission mechanism) 81 to 84 and the tires 91 to 94.

Gears are generally used for the torque transmission devices 81 to 84. Therefore, gear backlash occurs and causes an error between the angle converted from the motor angle of the steering motors 71 to 76 and the tire angle. In the fourth embodiment, the tire angle sensors 61 to 64 directly detect the angles of the tires 91 to 94. Thereby, the influence of the angle errors due to the backlash of the torque transmission device 81 or the like is eliminated. It is possible to detect current tire angles θs1 to θs4 with high accuracy.

Fifth Embodiment

Figure 16:
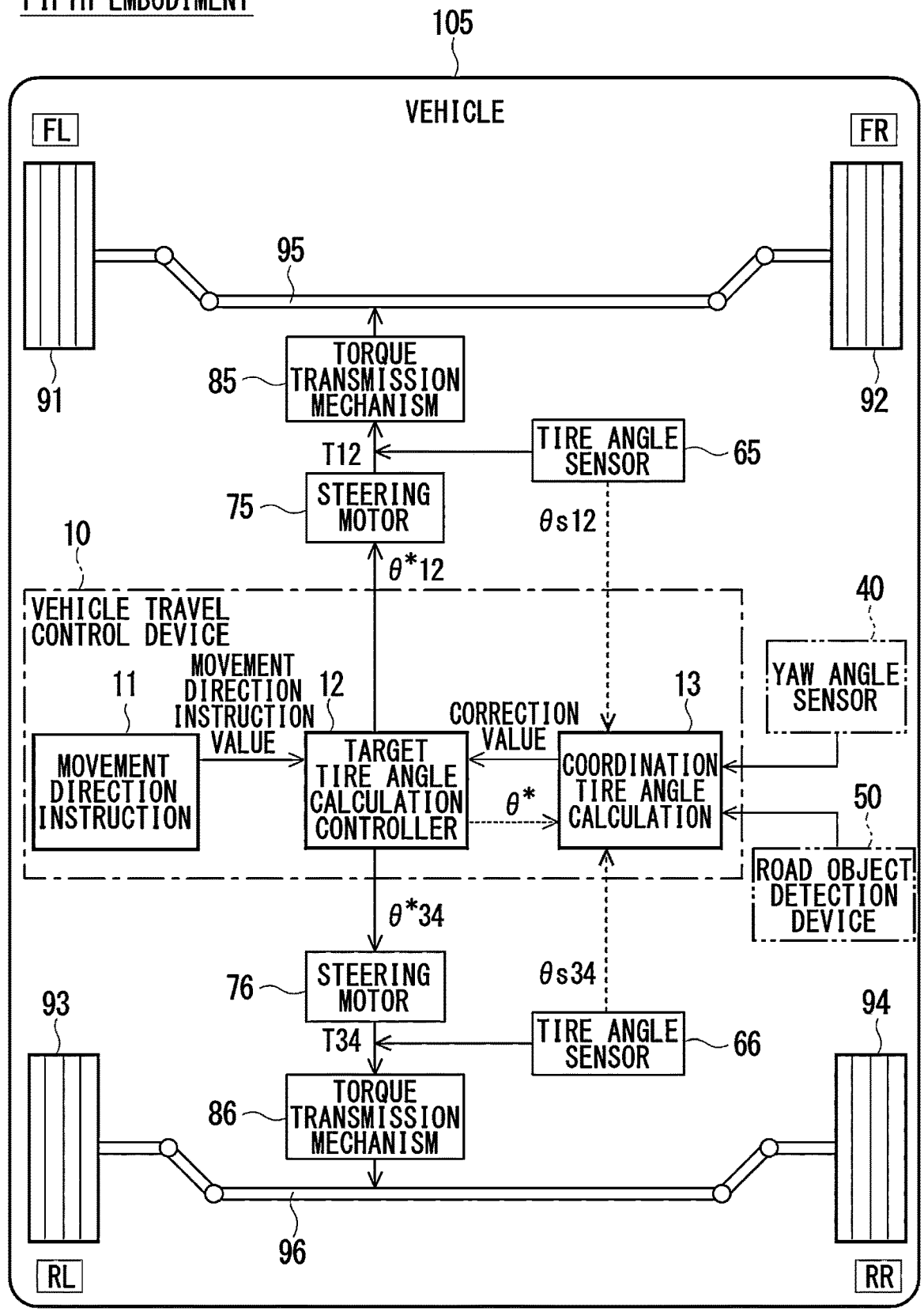
FIG. 16 is a block diagram of a vehicle equipped with a vehicle travel control device according to a fifth embodiment and mechanically coupled left and right wheels.

In the fifth embodiment, the vehicle travel control device 10 is mounted on a vehicle 105 in which the four wheels 91 to 94 are steerable and at least one pair of left and right wheels in the front or rear row are mechanically coupled. In an example shown in FIG. 16, the left and right wheels 91, 92 in the front row and the left and right wheels 93, 94 in the rear row are mechanically coupled by rack shafts 95, 96, respectively. The tires 91 to 94 is connected to ends of the rack shaft 95 or 96 via a link mechanism such as a tie rod. This corresponds to vehicles known as "4WS".

Although a detailed description of the link mechanism is omitted, it is preferable that each tire be configured to be able to turn at least 90 degrees and move laterally. However, even when the maximum steering angle is less than 90 degrees and lateral movement is not possible, oblique movement is possible. In this case, the coordination control may be performed only for the oblique movement.

In the front row, the steering torque T12 output by the steering motor 75 in accordance with the target tire angle θ*12 is transmitted to the rack shaft 95 via the torque transmission device 85, and the rack shaft 95 is driven to the left and right. As a result, the left front wheel 91 and the right front wheel 92 are steered together. The tire angle sensor 65 detects a current tire angle θs12 of the left front wheel 91 and the right front wheel 92, and notifies the coordination tire angle calculation unit 13.

In the rear row, a steering torque T34 output by the steering motor 76 in accordance with the target tire angle θ*34 is transmitted to the rack shaft 96 via the torque transmission device 86, and the rack shaft 96 is driven to the left and right. The left rear wheel 93 and the right rear wheel 94 are steered together. The tire angle sensor 66 detects a current tire angle θs34 of the left rear wheel 93 and the right rear wheel 94 and notifies the coordination tire angle calculation unit 13 of the detected current tire angle θs34. The coordination tire angle calculation unit 13 calculates the coordination tire angle so that the front row tire angle θs12 and the rear row tire angle θs34 become equal to each other.

The vehicle 105 having this configuration has fewer steering motors, torque transmission devices, and tire angle sensors than the independently steering vehicle 100. Therefore, vehicle costs are reduced. In addition, the calculation load of the coordination tire angle calculation unit 13 for the coordination tire angle is also reduced. In addition to the configuration shown in FIG. 16, the vehicle travel control device may be mounted on a partially independently steering vehicle in which, for example, the left front wheel 91 and the right front wheel 92 can be steered independently, and the left rear wheel 93 and the right rear wheel 94 are mechanically connected.

Other Embodiments

The independently steering vehicle 100 or the vehicle 105 in which the left and right wheels are mechanically coupled is not limited to a four-wheel vehicle, but may be a vehicle in which all the tires of three or more wheels are steerable.

The present disclosure should not be limited to the embodiment described above. Various other embodiments may be implemented without departing from the scope of the present disclosure.

The controller and the method thereof of the present disclosure may be implemented by a dedicated computer provided by configuring a processor and a memory programmed to execute one or more functions embodied by a computer program. Alternatively, the controller and the method thereof described in the present disclosure may be implemented by a dedicated computer provided by configuring a processor with one or more dedicated hardware logic circuits. Alternatively, the controller and the method thereof described in the present disclosure may be implemented by one or more dedicated computers configured by a combination of a processor and a memory programmed to execute one or more functions and a processor configured by one or more hardware logic circuits. The computer program may be stored in a non-transitory tangible computer-readable storage medium as an instruction to be executed by a computer.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A vehicle travel control device capable of steering all tires of three or more wheels and controlling travel of a vehicle in which a steering torque output by a steering motor in accordance with a target tire angle is transmitted to each tire via a torque transmission device to steer each tire, the vehicle travel control device comprising:
    a movement direction indication unit configured to provide an instruction indicating a direction of lateral movement or oblique movement;
    a target tire angle calculation controller configured to calculate a target tire angle of each tire based on a movement direction instruction value by the movement direction indication unit and provide an instruction indicating the target tire angle; and
    a coordination tire angle calculation unit configured to calculate a coordination tire angle for coordination of a movement direction of each tire based on a current tire angle of each tire detected by a tire angle sensor, wherein
    the target tire angle calculation controller is configured to correct the target tire angle calculated based on the movement direction instruction value to cause the target tire angle to approach the coordination tire angle, and provide an instruction indicating the corrected target tire angle to the steering motor.

2. The vehicle travel control device according to claim 1, wherein
    the vehicle travel control device is mounted on an independently steering vehicle capable of independently steering all tires of the three or more wheels.

3. The vehicle travel control device according to claim 1, wherein
    the vehicle travel control device is mounted on a vehicle including a yaw angle sensor that detects a yaw angle of the vehicle, and
    the coordination tire angle calculation unit is configured to calculate the coordination tire angle based on the yaw angle acquired from the yaw angle sensor.

4. The vehicle travel control device according to claim 1, wherein
    the vehicle travel control device is mounted on a vehicle including a road object detection device configured to detect a road object including a road white line and a guardrail, and
    the coordination tire angle calculation unit is configured to calculate the coordination tire angle based on a yaw angle deviation between the road object detected by the road object detection device and a vehicle body.

5. The vehicle travel control device according to claim 1, wherein
    the tire angle sensor is placed between a torque transmission mechanism and the tire.

6. A vehicle travel control device capable of steering all tires of three or more wheels and controlling travel of a vehicle in which a steering torque output by a steering motor in accordance with a target tire angle is transmitted to each tire via a torque transmission device to steer each tire, the vehicle travel control device comprising:
    a processor; and
    a memory coupled to the processor and storing program instructions that when executed by the processor cause the processor to at least:
    provide an instruction indicating a direction of lateral movement or oblique movement;
    calculate a target tire angle of each tire based on a movement direction instruction value and provide an instruction indicating the target tire angle;
    calculate a coordination tire angle for coordination of a movement direction of each tire based on a current tire angle of each tire detected by a tire angle sensor; and
    correct the target tire angle calculated based on the movement direction instruction value to cause the target tire angle to approach the coordination tire angle, and provide an instruction indicating the corrected target tire angle to the steering motor.

* * * * *